Nov. 16, 1954  G. T. WOLFE  2,694,232
INTERIOR PARTITION FOR ENCLOSED TRAILERS
Filed Aug. 23, 1951
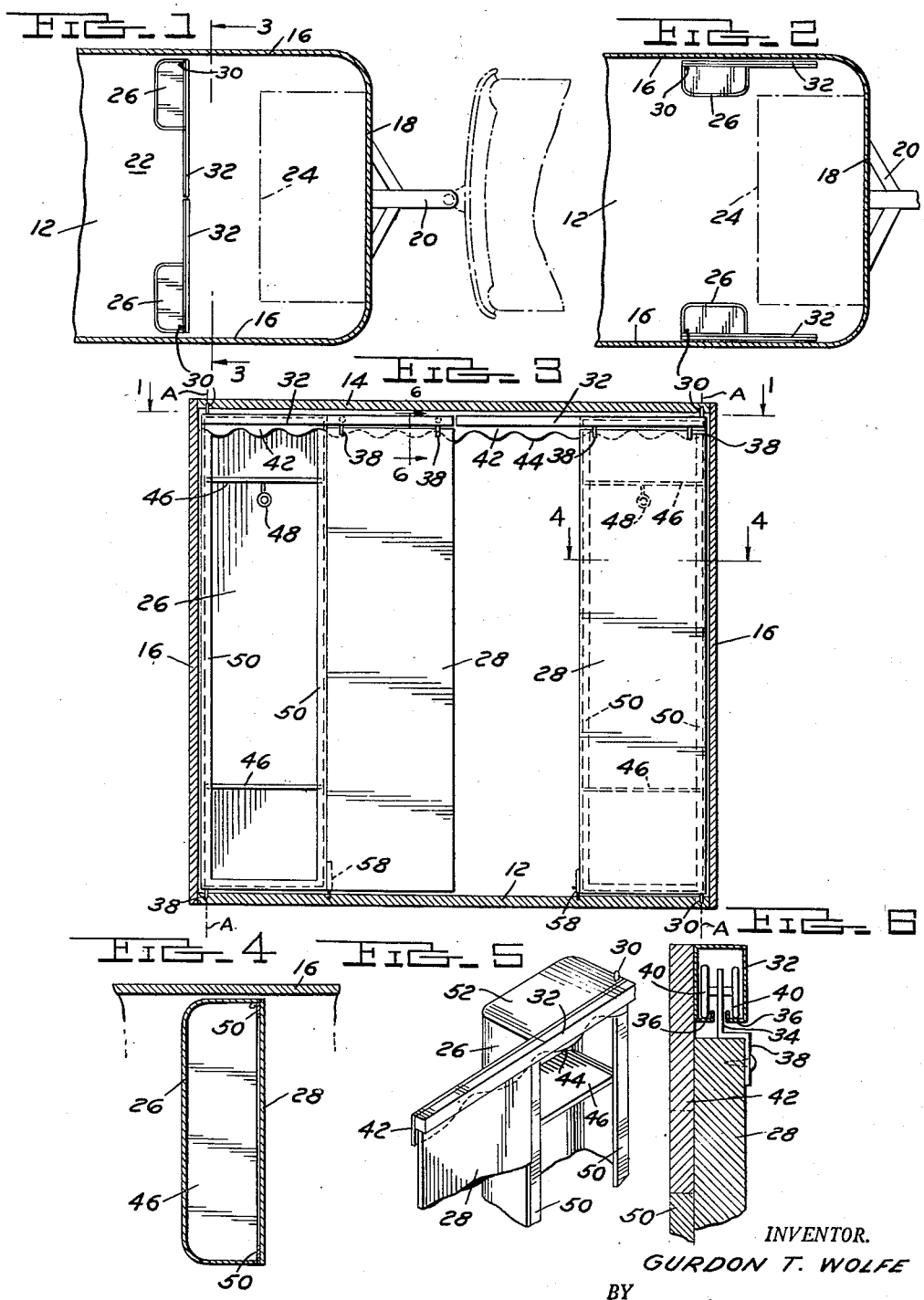
INVENTOR.
GURDON T. WOLFE
BY
ATTORNEYS

United States Patent Office 2,694,232
Patented Nov. 16, 1954

2,694,232

INTERIOR PARTITION FOR ENCLOSED TRAILERS

Gurdon T. Wolfe, Marlette, Mich.

Application August 23, 1951, Serial No. 243,201

3 Claims. (Cl. 20—2)

This invention relates to enclosed vehicular type trailers and particularly to a collapsible or foldable wall partition for dividing the interior of such trailers.

An important object of the invention is to improve the interior construction and arrangement of enclosed trailers and particularly to provide a novel form of movable wall partition for such vehicles which is capable of completely or partially dividing the interior thereof or which may be moved to substantially open position alongside of the walls of the trailer. Another important object of the invention is to provide an improved wall partition formed of wall sections supported or hung on one another and the vehicle and capable of being moved from a completely closed position extending unbrokenly across the trailer to partially and completely open positions. A further important object of the invention is to provide a wall partition of this character having certain of the sections constructed in a novel manner for use as storage compartments and regardless of any position assumed by the sections of the partition.

In carrying out the invention, the sections composing the wall partition are movably supported upon one another and the trailer body structure and are conveniently adjustable by hand to vary the interior of the trailer to suit the desires of those using the trailer. Preferably the wall partition is composed of four sections or members each having a width approximating one quarter of the width of the trailer. These four sections are movable to positions occupying separate areas of a common vertical plane extending transversely across the trailer to form an interior dividing wall therefor. Two of the four members are located adjacent to the side walls of the trailer and are referred to as outer wall sections or members of the partition. These two outer wall sections are hinged on vertical axes immediately adjacent to the side walls of the trailer body and are capable of being swung from positions extending substantially perpendicular to the side walls or crosswise of the trailer to positions substantially parallel and alongside of the side walls. In the perpendicular position assumed by the outer wall sections of the partition there is left a space therebetween approximately equal to one half of the width of the trailer.

The remaining two of the four partition sections are employed to close the intervening space between the hinged outer sections. In their space closing positions these two sections are disposed inwardly of the outer hinged sections and are referred to as the inner sections. An important feature of the invention is the mounting of the inner sections on the hinged outer sections for movement from said space closing position to positions co-extensive with the area occupied by the outer sections and alongside thereof. This is accomplished by mounting or hanging one of the inner wall sections on each of the outer sections and providing for movement of each inner section relative to the outer section such that it may be bodily adjusted from a position serving as an extension of the outer section to a condensed position alongside of the outer section. In one form of the invention illustrated herein, this is accomplished by slidably mounting each inner wall section on the outer wall section with which it is associated. In another form of the invention illustrated herein this is accomplished by pivotally connecting one vertical side margin of each inner section to the unhinged side of its outer section.

An important feature of the invention is the construction and functional characteristics of the members or sections composing the trailer dividing partition. Preferably, the outer wall sections of the partition are similarly formed and constructed so as to be relatively thick. Interiorly, each outer wall section is provided with a recess or cavity which opens out on one side thereof for accessibility. Each cavity serves as a storage space or compartment for receiving clothes and other articles. Another important feature of the invention is the arrangement whereby each inner wall section of the partition may be moved to close the opening of the compartment of its outer wall section to protect the articles enclosed therewithin as well as to improve the appearance of the interior of the trailer.

Various other objects, advantages and meritorious features of the invention will become more fully apparent from the following specification, appended claims and accompanying drawings, wherein:

Fig. 1 is a top plan view of one end portion of a trailer taken along line 1—1 of Fig. 3 and showing the sections of a dividing wall or partition constructed in accordance with this invention in completely closed condition;

Fig. 2 is a view similar to Fig. 1, but showing the sections of the dividing wall or partition in completely open condition;

Fig. 3 is a vertical cross sectional view through the trailer taken along line 3—3 of Fig. 1, and showing the rear side of the partition with one of the inner sections thereof in extended position and the other inner section thereof in retracted position;

Fig. 4 is a horizontal cross sectional view taken along line 4—4 of Fig. 3 and showing one inner wall section in compartment closing position alongside of its companion outer wall section;

Fig. 5 is a fragmentary perspective view of the upper portion of a companion set of inner and outer wall sections showing the inner section in extended relation to the outer section;

Fig. 6 is an enlarged fragmentary vertical sectional view taken along line 6—6 of Fig. 3.

In the drawings, the forward or front end section of a closed vehicle trailer is illustrated including a floor 12, a top or roof 14, and spaced apart parallel side walls 16—16 which extend from the floor to the roof and connect the same together. In addition, the front wall of the trailer is indicated at 18 from which a towing hitch 20 of conventional design projects for attachment to the rear end of a motor vehicle. Usually one set of wheels (not shown) is provided for supporting the trailer from the road or ground and these wheels are located approximately mid-way between the front and rear ends of the trailer.

The general purpose of this invention is to provide a retractible or collapsible transverse wall or partition in the interior of the trailer for dividing one portion of the trailer from the rest of the trailer. The dividing wall or partition is generally indicated at 22 in Fig. 1, and as illustrated herein is located near the front end of the trailer. In closed position the partition forms a private compartment or room at the forward end of the trailer which may be used as sleeping quarters during the night. In the open position of the partition the forward space of the trailer forms an extension to the balance of the interior. The members or sections of the partition are designed and shaped to conform with the interior of the trailer in either closed, partially open or fully open condition thereof. As shown in dotted outline in Figs. 1 and 2, the front end of the trailer may contain a studio-couch 24 which in the closed condition of the partition may serve as a bed and in the partially or fully open condition of the partition, may serve as a sofa.

The partition 22 is illustrated herein as being composed of four sections or members each having a width approximating one-fourth of the width of the trailer. Two of the members or sections are located adjacent to the side walls 16—16 of the trailer opposite one another and are indicated by reference characters 26—26. These two members are referred to as the outer sections of the partition. The remaining two members of the partition are employed to close the space between the outer members and are referred to herein by the reference characters 28—28. In the closed position of the partition, each member of the partition occupies a quarter section of the transverse plane of the partition completely extending across the trailer, as indicated in Fig. 1. Fig. 2 shows the members of the partition moved to fully opened position joining the space occupied by the studio-couch 24 with the balance of the interior of the trailer.

The outer sections or members 26—26 of the partition are similarly formed and as shown in Fig. 1 are positioned near the side walls 16—16 of the trailer. Each outer section or member 26 is hinged to the body of the trailer for swinging movement about a vertical axis located immediately adjacent the nearest side wall 16 of the trailer. The hinged axes for the outer members 26 are indicated by the reference lines A—A. Although each outer section may be hinged directly to the adjacent side wall 16 of the trailer, it is preferred to pivot each section to the floor 12 and the roof 14 of the trailer body immediately adjacent to the side wall. For this purpose, the top and bottom corners of each outer section 16 are provided with projecting hinged pintles 30, the upper one being received and pivoted in the roof 14 and the lower received and pivoted in the floor 12, as shown in Fig. 3. Hinged in this manner, the outer sections 26—26 are capable of being swung from a position perpendicularly related to the side wall 16—16, as shown in Fig. 1, to a position paralleling the side walls and extending alongside thereof, as shown in Fig. 2. The outer sections 26—26 of the partition are preferably relatively thick and form an interior recess or cavity for the purpose described hereinafter.

When disposed in their perpendicular relationship to the side walls 16—16, the two outer sections 26—26 only partially close the transverse plane of the partition, leaving a central area therebetween approximately equal to one-half of the width of the trailer. The two inner sections or members 28—28 of the partition are utilized to close this central space. One inner section 28 is associated with each outer section 26 and is jointly movable therewith. In addition, each inner section is mounted for movement relative to the outer section 26 with which it is associated from the space closing position to a position coextensive with and alongside of its associated outer section. In the embodiment of the invention illustrated in Figs. 1 to 6 inclusive, each inner section 28 is slidably mounted on the outer section 26 for bodily shiftable movement relative thereto.

In general, the slidable mounting for each inner section 28 comprises a track secured to the upper portion of the outer section with which the inner section is associated. Such track is shown in Fig. 6, comprising an elongated housing 32 having a rectangular cross section and provided with a downwardly opening central longitudinally extending slot 34. The bottom of the housing 32 is shaped to provide two parallel rails 36—36 on opposite sides of the slot 34 in the manner shown in Fig. 6. The upper end of each inner section 28 is suspended from the track member 32 for slidable movement therealong. This accomplished, as shown in Figs. 3 and 6, by the provision of two hangers 38 secured at their lower ends to the upper portion of the inner section and each carrying a pair of rollers 40—40 journaled for rotation about a common axis and arranged to roll on the rails 36—36. Suspended in this manner, each inner section 28 is capable of slidable movement in a plane immediately adjacent to and paralleling the plane of the outer section 26 with which it is associated.

As shown in Fig. 5, each track housing 32 is secured to the upper inside face of the outer section 26 and extends for a length approximately twice the width of the outer section. One half of the track overlies the back side of the outer section to which it is secured and the other half thereof projects laterally from the free or unhinged edge of the outer section as illustrated in Fig. 5. To conceal the track 32 from the front side of the outer section 26 and also to form an ornamental part of the partition, there is provided a supporting member for each track which is interposed between the outer section and the track. This supporting member is illustrated herein as being an elongated board 42 having a length substantially equal to that of the track 32 and provided with a straight upper edge and a scalloped lower edge indicated at 44.

The vertical dimension or width of the supporting board 42 is greater than that of the track 32 so that as viewed in Fig. 3, the scalloped edge 44 of the board depends below the track and conceals it from view when the partition is viewed from the rear end of the trailer. The track housing 32 is secured to the back or couch side of the supporting board 42 and the latter in turn is secured to the back or couch side of the outer section 26 with which it is associated. In this manner, the track is disposed in horizontal position along the upper edge of the outer section 26 and is supported in its projecting relationship thereof so as to provide movement of the inner section 28 from space closing position shown in Fig. 5 to a position coextensive with the area occupied by the outer section 26 and alongside thereof, as shown in Fig. 4.

It is evident from the description thus far made of the partition that the two inner sections 28—28 are slidable on their respective tracks 32 from a position closing the intervening space between the outer sections 26—26 to an open position overlying the back or studio-couch side of the outer sections. Fig. 3 shows one of the inner sections 28 in space closing position and exposing the back or studio-couch side of the outer section 26 with which it is associated. The other inner partition section 28 is shown in Fig. 3 as moved within the area occupied by its associated outer section 26 and in overlying relation to the back or studio-couch side thereof, completely closing the interior of the outer section.

The sections composed of partition 22 may be formed of any suitable material for the purpose. Preferably the material is light weight in order that the sections may be easily moved or swung by hand. A desirable material for the sections of the partition is plywood. The inner sections 28—28 may be formed of plywood disposed in one plane and so constructed they function as doors for closing the central intervening space between the outer sections 26—26. The outer sections are preferably formed of plywood or like material and shaped as previously described to assume a relatively thick formation. For this purpose, each outer section 26 is formed of plywood board having its opposite side marginal portions bent perpendicularly to its central portion to form a channel configuration in horizontal cross section as shown in Fig. 4. The corners formed by the bending of the side marginal portions are preferably curved as indicated in Fig. 4 to eliminate sharp corners and to give the appearance of solidity. Thus formed each outer partition section 26 exhibits a hollow interior opening out of the room or studio-couch side thereof when the sections are disposed in perpendicular relation to the side walls 16—16 of the trailer body.

An important feature of the invention is the utilization of the hollow interior of the outer partition sections 26—26 as small compartments for storing articles such as clothing and the like. As shown in Figs. 3 and 5, the interior of each outer section 26 may be provided with one or more shelves indicated at 46. Where two or more shelves are provided, they may be vertically spaced apart to the extent illustrated in Fig. 3. To the underside of the upper shelf there may be provided a hook or bar 48 for suspending clothing hangers and the like. The shelving 46 is preferably cut or otherwise shaped to conform to the channel configuration of the outer section 26 with which it is associated to reinforce the same.

In addition, the edges of the back side marginal portions of each outer section 26 may be reinforced by vertical strips of wood or other relatively rigid material indicated at 50. As shown in Figs. 4 and 5, these vertical strips are secured to the edges of the outer sections and extend inwardly toward one another in the same plane. The top and bottom of each outer section 26 may be closed by closure members 52 to protect the hollow interior thereof from dust and other foreign material. In order to bring the decorative track supporting board 42 into flush relationship with the inner edges of the outer section with which it is associated, the vertical reinforcing strips 50—50 may be foreshortened at their upper ends so that the supporting board lies within the plane of the strips in the manner shown in Fig. 6.

In the form of the invention illustrated herein the outer partition sections 26—26 are preferably removably secured in perpendicular relationship to the side walls 16—16 by means of releasable latch bolts or other suitable device. As shown in Fig. 3, the lower end of the inner or unhinged edge of each outer section 26 is provided with a vertical reciprocating releasable latch bolt 58 of conventional design which is capable of entering the recess in the floor 12 to hold the section with which it is associated in perpendicular relationship to the side walls of the trailer. This same latch bolt of each outer section may also be engageable with a recess formed in the floor immediately adjacent to the side wall to releasably hold the outer sections 26 in fully opened position as shown in Fig. 2.

What I claim is:

1. In a trailer having spaced apart side walls, a partition wall for dividing the interior of the trailer comprising: a pair of similarly formed outer wall sections of U-shaped cross section, each of said sections adapted to be hinged at the free edge of one of the two legs of the U-shape to a side wall of the trailer to be swung to one position to lie against the trailer side wall with the two legs of the section perpendicular to said side wall and to be swung to a second position to stand as a section perpendicular to said side wall with the legs of the section parallel thereto, a pair of inner wall sections one for each outer wall section, each inner wall section slidably supported upon its outer wall section to be slidably moved to one position to bridge the space between the legs of its outer wall section and form a closure therefor, and slidable to a second position to project outwardly from its outer wall section substantially within the plane thereof, said two inner wall sections adapted when in the second of said two positions adapted to bridge the space between the two wall sections when the same are swung to their second positions.

2. In a trailer having spaced apart side walls, a partition wall for dividing the interior of the trailer, comprising: a pair of similarly formed outer wall sections each shaped to define a hollow channel having a central portion and a pair of parallel opposed side portions extending perpendicularly away from the central portion, each of said sections having a width substantially equal one quarter the distance between said side walls, each of said sections complementarily hinged at the free edge of one of said side portions to each of said side walls, a pair of flat inner wall sections having a width substantially equal one quarter the distance between said side walls, means for slidably mounting each of the inner wall sections on an outer wall section including a horizontal channel shaped track mounted at the top of each outer wall and extending outwardly therefrom in the plane of the outer wall section, and means mounted on each inner wall section and adapted to be slidably received within a channel to hold the inner sections suspended therefrom, said inner walls slidable to one position to close the space between the side portions of each outer wall and slidable to another position to lie extended from the outer walls and in a plane parallel to the central portions thereof.

3. In a trailer having spaced apart side walls, a partition wall for dividing the interior of the trailer comprising: a pair of similar outer wall sections substantially U-shaped in cross section with the legs of the U-shape being spaced farther apart than their height, each section hinged at the edge of one of the legs of the U-shape to the side walls of the trailer and movable to one position with the legs of the U-shape substantially perpendicular to the side walls of the trailer and movable to a second position with said legs substantially perpendicular to the side walls, each section having a width equal to less than one half the distance between the side walls of the trailer, a pair of inner wall sections, one of the inner wall sections slidably mounted on each of the outer walls, said inner walls slidable to one position to close the spaces between the legs of each of the outer wall sections and slidable to another position to close the space between the outer wall sections when the latter are disposed in their second mentioned position.

References Cited in the file of this patent

UNITED STATES PATENTS

| Number | Name | Date |
|---|---|---|
| 2,200,934 | Platt et al. | May 14, 1940 |
| 2,230,975 | Gratz | Feb. 4, 1941 |
| 2,247,340 | Webster | June 24, 1941 |
| 2,516,527 | Oltz | July 25, 1950 |

FOREIGN PATENTS

| Number | Country | Date |
|---|---|---|
| 539,557 | Great Britain | Sept. 16, 1941 |